No. 762,690. PATENTED JUNE 14, 1904.
W. J. CONNELL.
CATCH BASIN.
APPLICATION FILED AUG. 26, 1903.
NO MODEL. 3 SHEETS—SHEET 1.

Witnesses

Inventor
William J. Connell,
By Victor J. Evans, Attorney

No. 762,690. PATENTED JUNE 14, 1904.
W. J. CONNELL.
CATCH BASIN.
APPLICATION FILED AUG. 26, 1903.
NO MODEL.
3 SHEETS—SHEET 3.

Witnesses
Wm J. Koerth
Hubert D. Lawson

Inventor
William J. Connell,
By Victor J. Evans
Attorney

No. 762,690.                                   Patented June 14, 1904.

UNITED STATES PATENT OFFICE.

WILLIAM J. CONNELL, OF FAIRMONT, WEST VIRGINIA.

CATCH-BASIN.

SPECIFICATION forming part of Letters Patent No. 762,690, dated June 14, 1904.

Application filed August 26, 1903. Serial No. 170,855. (No model.)

*To all whom it may concern:*

Be it known that I, WILLIAM J. CONNELL, a citizen of the United States, residing at Fairmont, in the county of Marion and State of West Virginia, have invented new and useful Improvements in Catch-Basins, of which the following is a specification.

My invention relates to new and useful improvements in catch-basins; and its object is to provide a catch-basin having means whereby solid substances passing thereinto will be prevented from flowing outward into the pipes leading from the sewer.

A further object is to employ simple mechanism whereby the material which may accumulate within the separating device can be readily removed from the catch-basin.

With the above and other objects in view the invention consists in the novel construction and combination of parts hereinafter more fully described and claimed, and illustrated in the accompanying drawings, showing the preferred form of my invention, and in which—

Figure 1:
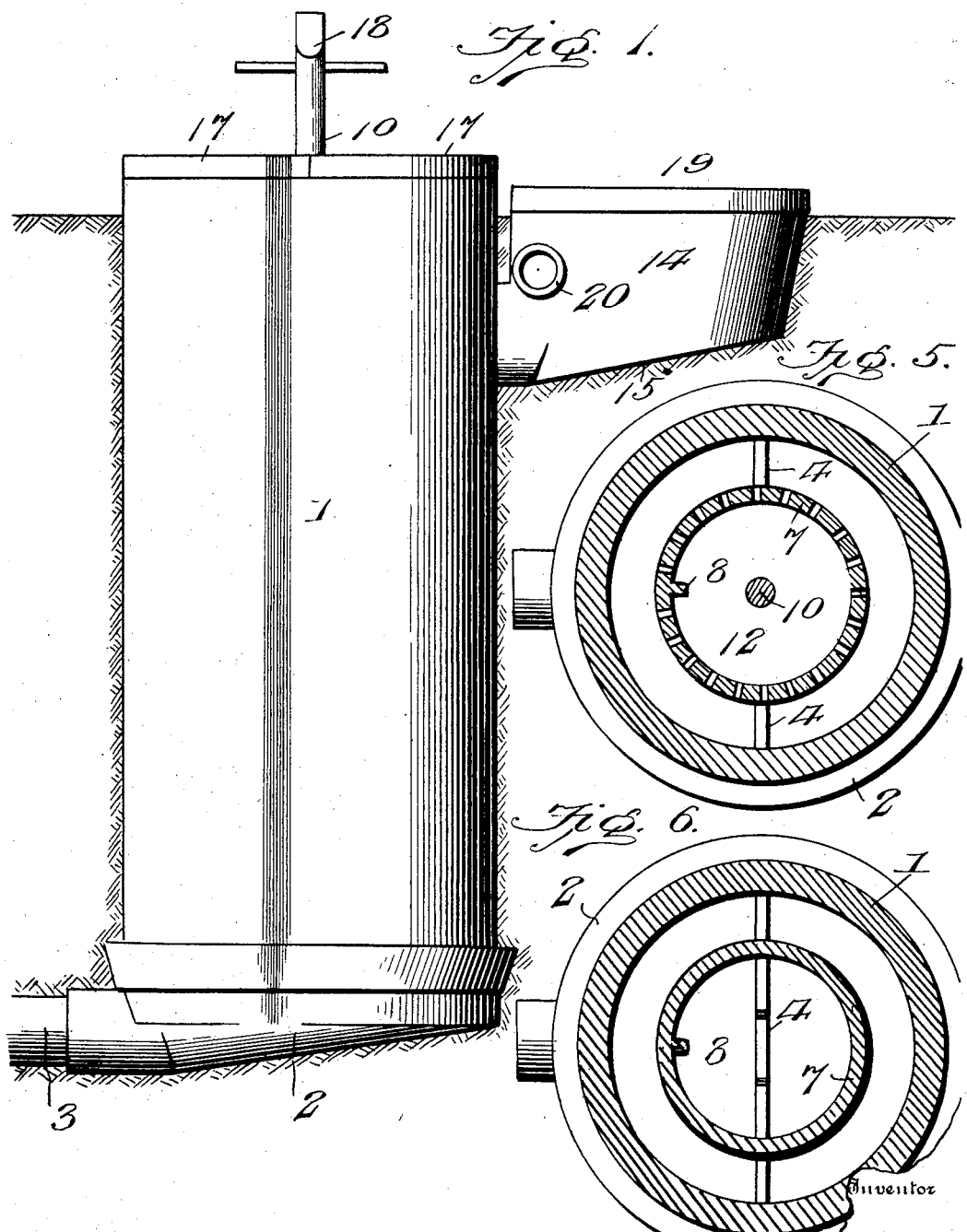
Figure 2:
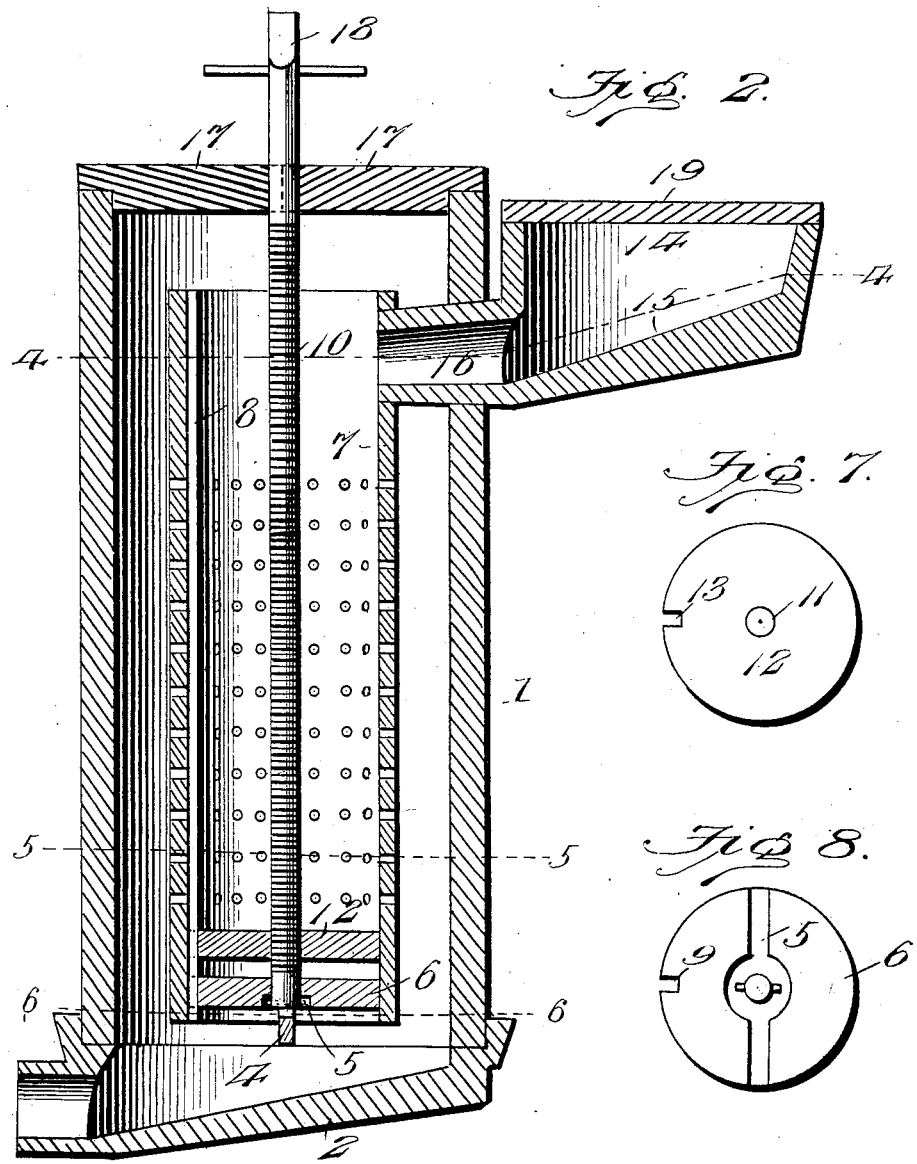
Figure 3:
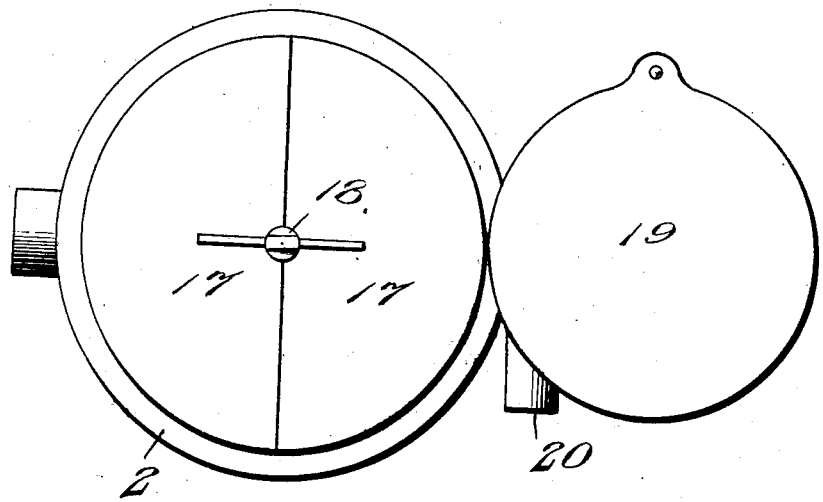
Figure 4:
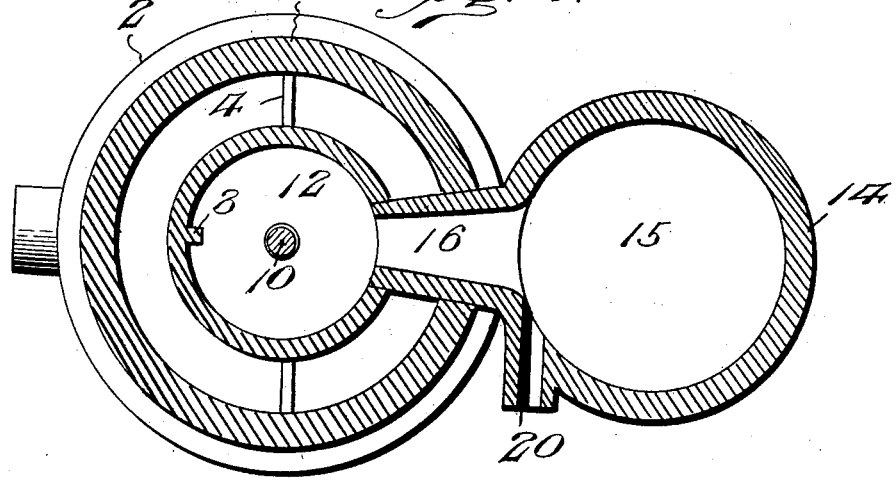

Figure 1 is a side elevation of the catch-basin. Fig. 2 is a vertical section therethrough. Fig. 3 is a plan view. Fig. 4 is a section on line 4 4, Fig. 2. Fig. 5 is a section on line 5 5, Fig. 2. Fig. 6 is a section on line 6 6, Fig. 2. Fig. 7 is a detail view of the movable disk of the cleaning apparatus, and Fig. 8 is a bottom plan view of the removable bottom of the separator.

Referring to the figures by numerals of reference, 1 is the body of the catch-basin, which is formed in any suitable manner, as of tiles, bricks, or other devices, and it is preferably cylindrical in form and has an inclined bottom 2, to which is adapted to be connected an outlet-pipe 3. Supported upon the bottom of the body 1 is a cross-bar 4, which projects into a transversely-extending groove 5, formed within the bottom of a disk 6. This disk is fitted within the lower end of a perforated cylinder 7, which forms a separator, and a rib 8 extends longitudinally within the cylinder, and the disk 6 has a recess 9 in its periphery for the reception of this rib. A screw-threaded rod 10 is swiveled within the center of the disk 6 and extends through a threaded aperture 11, formed within the center of a scraping-disk 12, which is slidably mounted within the cylinder 7 and has a recess 13 in its periphery for the reception of a rib 18. This disk is normally located at the upper end of the body 1. A reservoir 14 is arranged outside and adjacent the body 1 and has an inclined bottom 15, which leads to an outlet-pipe 16. This pipe extends into the body 1 and opens into the upper portion of the separating-cylinder 7. The body 1 is provided with a closure 17, preferably formed of two sections adapted to be placed at opposite sides of the rod 10, and said rod projects above this closure and is provided with a head 18, whereby the same may be readily engaged by a suitable tool for the purpose of rotating the rod. A plate 19 is pivoted upon the reservoir 14 and serves as a closure therefor.

After the separating-cylinder 7 has been placed within the body 1 the disk 12 is arranged upon the rod 10, near the upper end thereof, and the two disks 6 and 12 are then inserted into the cylinder, with the rib 8 within the recesses 9 and 13. The lower disk 6 will thus be brought into position with its groove 5 registering with the cross-bar 4, and the disk 12 will be located within the cylinder at its upper end. When water enters the reservoir 14 through an inlet-pipe 20, it flows downward through the pipe 16 into the separating-cylinder 7 and thence through the apertures in said cylinder to the bottom of the body 1 and out through the outlet-pipe 3. Large foreign substances which are carried into the cylinder with the liquid are separated therefrom because too large to pass through the apertures. It will thus be seen that clogging of the outlet-pipe is prevented. After a considerable quantity of solid matter has accumulated within the cylinder 7 the same can be removed by rotating the rod 10. As this rod is swiveled in the lower disk 6 and is revolubly mounted within the disk 12, it is obvious that the last-mentioned disk will be slid downward and scrape the dirt, &c., from the walls of the cylinder and carry it downward and compress it upon the lower disk 6. The two disks can then be raised by lifting the rod 10 upward, and the solid matter will thus be removed from the cylinder. The device is placed in condition for further use by rotating the disk 12 upon rod 10 until it is returned to its normal position near the upper end of the rod. The pipe 20 is an inlet to the reservoir 14 and serves as a trap to prevent the escape of noxious gases.

It will be seen that the construction is very simple and thoroughly separates all foreign substances from the liquid admitted to the catch-basin, thereby preventing clogging of the pipes extending therefrom.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described my invention, what I claim as new, and desire to secure by Letters Patent, is—

1. In a device of the character described, the combination with a body having an outlet; of a perforated separating-cylinder supported within the body and having an inlet, a scraping and compressing disk within the cylinder and means for moving said disk longitudinally therein.

2. In a device of the character described, the combination with a body having an outlet; of a perforated separating-cylinder supported within the body and having an inlet, a scraping and compressing disk within the cylinder, and a threaded rod swiveled within and extending longitudinally of the cylinder and engaging the scraping-disk.

3. In a device of the character described, the combination with a body having an outlet, and a cross-bar within the body; of a perforated separating-cylinder supported upon the cross-bar, a longitudinally-extending rib within the cylinder, a scraping and compressing disk within the cylinder and engaging the rib, and means for moving the disk longitudinally within the cylinder.

4. In a device of the character described, the combination with a body having an outlet; of a perforated separating-cylinder supported therein and having an inlet, a disk within the cylinder, a threaded rod swiveled therein and extending longitudinally of the cylinder, and a scraping and compressing disk upon and engaging the rod.

5. In a device of the character described, the combination with a body having an outlet; and a cross-bar within the body; of a perforated separating-cylinder supported by the bar, a disk within the separating-cylinder and bearing upon and engaging the cross-bar, a rib extending longitudinally within the cylinder, a threaded rod swiveled within the disk and extending longitudinally of the separating-cylinder, a scraping and compressing disk mounted upon the rod and engaging the rib, and a closure for the body.

6. In a device of the character described, the combination with a body having an outlet; of a cross-bar within the body, a perforated separating-cylinder supported by a cross-bar, a longitudinally-extending rib within said cylinder, a disk within the cylinder and engaging the rib and cross-bar, a threaded rod swiveled within the disk, a scraping and compressing disk mounted upon the rod, a reservoir having an inlet, a pipe connecting the reservoir with the separating-cylinder, and a closure for the body.

In testimony whereof I affix my signature in presence of two witnesses.

WILLIAM J. CONNELL.

Witnesses:
N. C. STEELE,
W. H. STOVER.